March 10, 1931.  H. SUIDA  1,796,059
PROCESS FOR RECOVERING CONCENTRATED ACETIC ACID FROM DILUTE ACETIC ACID
Filed Feb. 16, 1928
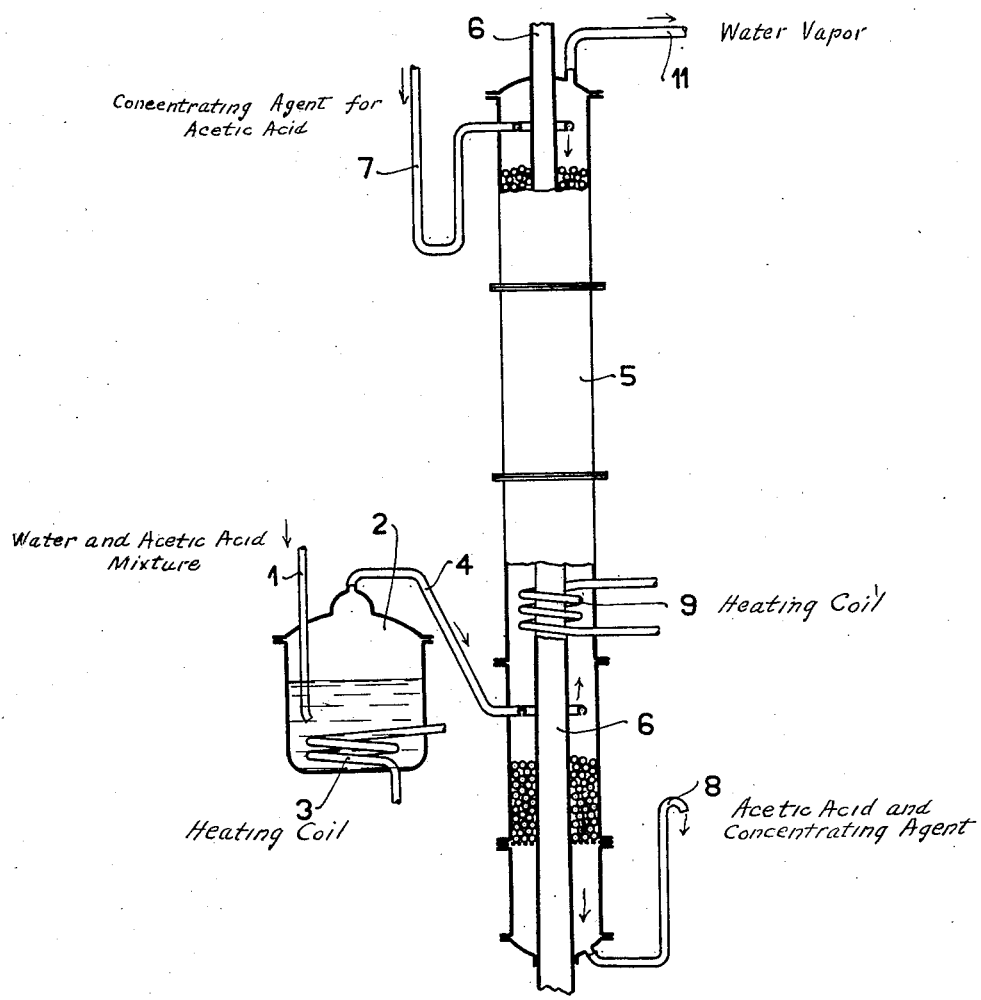

Patented Mar. 10, 1931

1,796,059

UNITED STATES PATENT OFFICE

HERMANN SUIDA, OF MODLING, AUSTRIA

PROCESS FOR RECOVERING CONCENTRATED ACETIC ACID FROM DILUTE ACETIC ACID

Application filed February 16, 1928, Serial No. 254,895, and in Austria July 14, 1927.

In Patent No. 1,621,441 a process for the recovery of concentrated acetic acid from dilute acetic acid is disclosed, which consists in conducting a homogeneous organic solvent or concentrating agent, insoluble or difficultly soluble in water and possessing a boiling point higher than that of acetic acid, in counter-current to the superheated vapours of water and acetic acid, recovering the concentrating agent containing the acetic acid in the concentrated condition and separating the mixture in known manner by distillation into the acid-free concentrating agent and concentrated acetic acid.

In the aforesaid patent a series of various types of solvents or concentrating agents are given by way of example which are suitable for use in the process. Chief among these solvents are phenols which exhibit good concentrating powers in respect of acetic acid. In so far as the concentrating agents are volatile to a limited extent with water vapours, losses of the same due to their solubility in discharge water result, and these losses must be recovered from the acetic acid-free discharge water.

I have found that the esters of cyclical, particularly polybasic carboxylic acids which exhibit very high boiling points, great stability and a very slight volatilizability, possess excellent concentrating powers in respect of dilute acetic acid, and that these esters may therefore be employed primarily where tar-free acetic acid vapours are to be concentrated, that is, for example, in the reconcentration of the discharge from the cellulose acetate manufacture. Thus, for example, the methyl, ethyl and butyl esters of the naphthene acids or the analogous esters of orthophthalic acid exhibit excellent concentrating powers. Therewith the losses resulting due to the volatilizability with water vapour and the solubility in water, particularly of the esters with higher alcohols, are so slight that a considerable technical advance is attained by their use. For example orthophthalic acid dibutyl ester boils at 310–320° C. and the solubility of this ester in water is less than one gram of the ester in one liter of water.

The following examples and the annexed drawing serve to illustrate the process of this invention:

1. Dilute, for example 30 per cent, acetic acid is passed through a pipe 1 into a still 2 and is vaporized by means of a coil 3. The vapors pass through the pipe 4 into the lower part of a column 5 charged with filling material, such as rings or the like, a heating tube 6 extending axially of said column. A steam coil 9 in the column 5 above the outlet of the pipe 4 serves to superheat the acetic acid-water vapor mixture. Orthophthalic acid dibutyl ester is allowed to flow into the upper part of the column 5 through a pipe 7. Thus while one part of dilute acetic acid is passed in vapor form from the pipe 4 through the column, 1 to 2 parts of orthophthalic acid dibutyl ester are simultaneously fed in liquid form into the upper part of the column. The column 5 is extended below the outlet of the pipe 4 and its lower portion is maintained at a temperature of 150° C. in known manner by means of the heating coil 9. Water vapor practically free from acetic acid leaves the upper part of the column through a pipe 11 and carries with it practically none of the solvent. The mixture of orthophthalic acid dibutyl ester, charged with 15–30% of concentrated acetic acid, flows out from the lower portion of the column through the siphon tube 8. The resulting mixture is separated in known manner for example by distillation in a vacuum apparatus, into concentrated acetic acid and acid-free orthophthalic acid dibutyl ester.

2. The operation is carried out in the same manner as in Example 1 using orthophthalic acid dihexyl ester as solvent and keeping the proportions of dilute acetic acid and solvent about the same. For the concentration use is made of a column, such as 5, to the upper part of which the orthophthalic acid dihexyl ester is fed, as through the pipe 7, while the vapours of dilute acetic acid are fed into a lower part of the column from a vaporizer, such as 2, and flow upwardly through the column. In the lower part of the column the solvent charged with acetic acid collects, provision being made for heating the lower part of the column to a temperature of 150-155° C., as by means of a coil 9. The mixture on leaving the column through a syphon tube, such as 8, is separated in known manner into the orthophthalic acid dihexyl ester and concentrated acetic acid. In this case the water vapours freed from the acetic acid pass away, as through the pipe 11, without carrying off any trace at all of solvent. The vapours may be condensed and led away. The acetic acid obtained is of 95 to 99% concentration depending upon the temperature maintained at the lowest end of the column.

3. Technical ethyl esters of naphthene acids can be employed in place of orthophthalic acid dibutyl ester in a similar manner as described for Example 1, or in the place of orthophthalic acid dihexyl ester as used in Example 2.

Use may, however, also be made of even higher boiling esters of phthalic acid, for example esters of heptyl alcohol or the neutral esters of glycol and of glycerine inter alia.

What I claim is:

1. A process for recovering concentrated acetic acid from dilute acetic acid, consisting in bringing a superheated acetic acid-water vapor mixture in direct contact with a counter-flow of a liquid ester formed by the chemical union of a cyclical carboxylic acid with an aliphatic alcohol, whereby the acetic acid is extracted from the mixture, and then separating the resulting solution into concentrated acetic acid and acid free ester.

2. A process according to claim 1, in which the ester therein is replaced by a liquid ester of a polybasic cyclical carboxylic acid.

3. A process according to claim 1, in which the ester therein is replaced by a liquid ester formed by the chemical union of a polybasic cyclical carboxylic acid with a monohydroxy aliphatic alcohol.

4. A process according to claim 1, in which the ester therein is replaced by a liquid ester formed by the chemical union of an orthophthalic acid with an aliphatic alcohol.

5. A process according to claim 1 in which the ester therein is replaced by orthophthalic dihexylester.

In testimony whereof I have hereunto set my hand.

HERMANN SUIDA.